and a signal driver for generating a wireless signal for communication with the smart key according to an active signal generated by the control unit at a predetermined period in a time zone with high operation frequency by comparing operation numbers of respective time zones and a threshold operation number with reference to the operation time table, while the vehicle is parked.

United States Patent
Kim et al.

(10) Patent No.: US 9,990,789 B2
(45) Date of Patent: Jun. 5, 2018

(54) SMART KEY CONTROLLER FOR VEHICLE ROUTING PATTERN-BASED VARIABLE CONTROL AND METHOD THEREOF

(71) Applicant: HYUNDAI MOTOR COMPANY, Seoul (KR)

(72) Inventors: Jin Kim, Suwon-si (KR); Chul Min Kim, Yongin-si (KR); Young Su Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/059,999

(22) Filed: Mar. 3, 2016

(65) Prior Publication Data

US 2017/0103594 A1    Apr. 13, 2017

(30) Foreign Application Priority Data

Oct. 13, 2015  (KR) ........................ 10-2015-0143030

(51) Int. Cl.
*G07C 9/00* (2006.01)
*B60Q 1/24* (2006.01)
*B60Q 1/50* (2006.01)

(52) U.S. Cl.
CPC ........... *G07C 9/00182* (2013.01); *B60Q 1/24* (2013.01); *B60Q 1/50* (2013.01); *G07C 2009/00507* (2013.01); *G07C 2009/00793* (2013.01)

(58) Field of Classification Search
CPC .................. G07C 9/00182; G07C 2009/00793

USPC ......................................................... 340/5.64
See application file for complete search history.

(56) References Cited

U.S. PATENT DOCUMENTS

| | | | |
|---|---|---|---|
| 6,670,883 B1 * | 12/2003 | Asakura | B60R 25/24 307/10.1 |
| 8,989,955 B1 | 3/2015 | Hart | |
| 2008/0073057 A1 * | 3/2008 | Kojima | B60H 1/00735 165/43 |
| 2014/0114503 A1 | 4/2014 | Ghabra et al. | |
| 2014/0176304 A1 | 6/2014 | Park | |
| 2014/0316609 A1 * | 10/2014 | Washington | B60R 16/037 701/2 |

FOREIGN PATENT DOCUMENTS

| | | |
|---|---|---|
| CN | 103774917 A | 5/2014 |
| CN | 104002765 A | 8/2014 |
| JP | 2002-081239 A | 3/2002 |

(Continued)

*Primary Examiner* — Vernal Brown
(74) *Attorney, Agent, or Firm* — McDermott Will & Emery LLP

(57) ABSTRACT

A smart key controller for controlling a vehicle through wireless communication with a smart key includes a control unit for including a timer and a memory, creating an operation time table regarding operation numbers by time zones based on the timer by checking an ignition signal, and storing the created operation time table in the memory, and a signal driver for generating a wireless signal for communication with the smart key according to an active signal generated by the control unit at a predetermined period in a time zone with high operation frequency by comparing operation numbers of respective time zones and a threshold operation number with reference to the operation time table, while the vehicle is parked.

16 Claims, 8 Drawing Sheets

(56) References Cited

FOREIGN PATENT DOCUMENTS

| | | |
|---|---|---|
| JP | 2006-233423 A | 9/2006 |
| JP | 2014-035647 A | 2/2014 |
| KR | 10-2007-0016385 A | 2/2007 |
| KR | 10-0801874 B1 | 2/2008 |
| KR | 10-2013-0033120 A | 4/2013 |
| KR | 10-2013-0037947 A | 4/2013 |
| KR | 10-2014-0090728 A | 7/2014 |
| WO | 2012/141388 A1 | 10/2012 |

* cited by examiner

| TIME | MON | TUES | WED | THU | FRI | SAT | SUN |
|------|-----|------|-----|-----|-----|-----|-----|
| ... | 1 | 2 | 0 | 6 | 8 | 0 | 0 |
| ... | 7 | 3 | 0 | 10 | 7 | 11 | 7 |
| ... | 10 | 4 | 1 | 10 | 0 | 15 | 23 |
| ... | 16 | 5 | 1 | 7 | 0 | 10 | 45 |
| ... | 14 | 5 | 3 | 8 | 7 | 22 | 65 |
| ... | 9 | 4 | 6 | 4 | 15 | 8 | 9 |
| ... | 7 | 3 | 4 | 5 | 7 | 5 | 5 |
| ... | 6 | 1 | 3 | 7 | 23 | 3 | 7 |
| ... | 5 | 16 | 2 | 35 | 6 | 3 | 6 |
| ... | 9 | 16 | 1 | 35 | 5 | 2 | 5 |
| ... | 7 | 18 | 0 | 9 | 0 | 0 | 4 |

FIG.3

| PATTERN | DEPARTURE LOCATION | ARRIVE LOCATION | DRIVING TIME | FREQUENCY OF USE | FINAL TIME |
|---|---|---|---|---|---|
| 1 | LOCATION 1 | LOCATION 2 | 50m | 20 | xxxx |
| 2 | LOCATION 2 | LOCATION 1 | 60m | 20 | xxxx |
| 3 | LOCATION 1 | LOCATION 3 | 20m | 15 | xxxx |
| 4 | LOCATION 3 | LOCATION 4 | 1h 1m | 10 | xxxx |
| ... | ... | ... | ... | ... | ... |
| x | LOCATION X | LOCATION Y | 3hr | 5 | xxxx |

FIG.5

| TIME | MON | TUES | WED | THU | FRI | SAT | SUN |
|---|---|---|---|---|---|---|---|
| ... | PATTERN 1 | ... | | | | | |
| ... | PATTERN 1 | ... | PATTERN 1 | PATTERN 1,3 | | PATTERN 4,x | |
| ... | PATTERN 1,3 | ... | | PATTERN 1,3 | | PATTERN 4,x | PATTERN x |
| ... | PATTERN 1,3 | ... | | | | PATTERN 4,x | PATTERN x |
| ... | PATTERN 1,3 | ... | | | | PATTERN 4,x | PATTERN x |
| ... | PATTERN 1,3 | ... | | | PATTERN x | | PATTERN x |
| ... | PATTERN 4 | ... | | | PATTERN x | | PATTERN 1 |
| ... | PATTERN 4 | ... | | | | | PATTERN x |
| ... | PATTERN 2 | PATTERN 2 | PATTERN 2 | PATTERN 2 | | | PATTERN x |
| ... | PATTERN 2 | PATTERN 2 | | PATTERN 2 | | | PATTERN x |
| ... | PATTERN 2 | PATTERN 2 | | | | | PATTERN 2 |

FIG.6

SMART KEY CONTROLLER FOR VEHICLE ROUTING PATTERN-BASED VARIABLE CONTROL AND METHOD THEREOF

CROSS-REFERENCE TO RELATED APPLICATION

This application claims the benefit of priority to Korean Patent Application No. 10-2015-0143030, filed on Oct. 13, 2015 with the Korean Intellectual Property Office, the disclosure of which is incorporated herein in its entirety by reference.

TECHNICAL FIELD

The present disclosure relates to a smart key controller of a vehicle and a method thereof, and more particularly, to a smart key controller variably operating according to a vehicle routing pattern, and a method thereof.

BACKGROUND

A user of a vehicle smart key may wirelessly operate and control starting of a vehicle, opening and/or closing a vehicle door or trunk, or a welcome function by using a smart key. In particular, the welcome function may be a function enabling a user to approach a vehicle and operate a smart key to control unfolding an outside mirror (an outside mirror in a folded state is automatically spread) or control turning on a puddle lamp positioned at a lower end of the outside mirror or a door handle lamp, or control turning on a tail light or a room lamp to enhance visibility.

The welcome function may not always be in an ON state. That is, in order to avoid battery discharge and increase starting performance, the welcome function may be turned off when a predetermined period of time (for example, fourteen days) has lapsed since an ignition of a vehicle was turned off and the vehicle was parked with doors locked.

Thus, while the smart key controller of the vehicle is operated while the welcome function is maintained in an ON state for the predetermined period of time after parking, the smart key controller may consumes a relatively large amount of dark current by periodically transmitting a wireless signal (for example, a low frequency (LF) signal) for smart key and authentication using battery power, leading to a situation where the welcome function cannot be maintained for a relatively long period of time.

SUMMARY

The present disclosure has been made to solve the above-mentioned problems occurring in the prior art while advantages achieved by the prior art are maintained intact.

An aspect of the present disclosure provides a smart key controller capable of analyzing a vehicle routing pattern of a user and variably operating according to the analyzed vehicle routing pattern to thereby reduce a dark current for an operation of the smart key controller and lengthen a welcome function providing time, and a method thereof.

According to an exemplary embodiment of the present disclosure, a smart key controller for controlling a vehicle through wireless communication with a smart key includes: a control unit configured to include a timer and a memory, create an operation time table regarding operation numbers by time zones based on the timer by checking an ignition signal, and store the created operation time table in the memory; and a signal driver configured to generate a wireless signal for communication with the smart key according to an active signal generated by the control unit at a predetermined period in a time zone with high operation frequency by comparing operation numbers of respective time zones and a threshold operation number with reference to the operation time table, while the vehicle is parked.

The signal driver may generate a wireless signal for a welcome function including unfolding an outside mirror, turning on a puddle lamp provided in the outside mirror, turning on a door handle lamp, turning on a tail light, or turning on a room lamp.

The control unit may generate the operation time table regarding operation numbers of respective time zones by days. The control unit may generate the operation time table by applying different weights to the respective time zones according to sizes of valid operation numbers of the respective time zones through learning during a predetermined period of time.

The control unit may further include a controller area network (CAN) controller for collecting location information (for example, global positioning system (GPS)) received through a CAN transceiver, wherein the control unit may generate the active signal by further reflecting information regarding an operation location with predetermined operation frequency or greater according to results of analyzing the location information through learning during a predetermined period of time.

The control unit may store an operation location pattern table regarding a departure location and a destination and an operation location table regarding operation location patterns by time zones with predetermined frequency or greater in the memory, and estimate start time zones for next destinations from a parking location with reference to the operation location patterns on the operation location table while the vehicle is parked, to generate the active signal with respect to a corresponding time zone.

Regarding a time zone with less than the threshold operation number, the control unit may control the signal driver to stop generation of the wireless signal to turn off a welcome function, control the signal driver to generate the wireless signal at a period slower than the period, or control the signal driver to generate the wireless signal at a period slower than the period during a predetermined period of time before and after the time zone with the high operation frequency and subsequently turn off the welcome function.

Information regarding remaining battery capacity may be received, and when the remaining battery capacity is lower than a predetermined threshold value, the control unit may control the signal driver to stop generation of the wireless signal to turn off the welcome function.

According to another exemplary embodiment of the present disclosure, a method for operating a smart key controller for controlling a vehicle through wireless communication with a smart key, includes: creating an operation time table regarding operation numbers by time zones based on a timer by checking an ignition signal; generating an active signal generated at a predetermined period in a time zone with high operation frequency by comparing operation numbers of respective time zones and a threshold operation number with reference to the operation time table, while the vehicle is parked; and generating a wireless signal for communication with the smart key according to the active signal.

In the generating of the wireless signal, the wireless signal for a welcome function including unfolding an outside mirror, turning on a puddle lamp provided in the outside mirror, turning on a door handle lamp, turning on a tail light, or turning on a room lamp may be generated.

In the generating of the operation time table, the operation time table regarding operation numbers of respective time zones by days may be generated. In the generating of the operation time table, the operation time table may be generated by applying different weights to the respective time zones according to sizes of valid operation numbers of the respective time zones through learning during a predetermined period of time.

The method may further include: collecting location information (for example, global positioning system (GPS)) received through a controller area network (CAN) transceiver, wherein in the generating of the active signal, the active signal may be generated by further reflecting information regarding an operation location with predetermined operation frequency or greater according to results of analyzing the location information through learning during a predetermined period of time.

The method may further include: generating an operation location pattern table regarding a departure location and a destination and an operation location table regarding operation location patterns by time zones with predetermined frequency or greater, before the active signal is generated, wherein, in the generating of the active signal, the active signal with respect to a corresponding time zone may be generated by estimating start time zones for next destinations from a parking location with reference to the operation location patterns on the operation location table, while the vehicle is parked.

Regarding a time zone with less than the threshold operation number, generation of the wireless signal may be controlled to be stopped to turn off the welcome function, the wireless signal may be controlled to be generated at a period slower than the period, or the wireless signal may be controlled to be turned off at a period slower than the period during a predetermined period of time before and after the time zone with the high operation frequency and the welcome function may be subsequently turned off.

Information regarding remaining battery capacity may be received, and when the remaining battery capacity is lower than a predetermined threshold value, generation of the wireless signal may be controlled to be stopped to turn off a welcome function.

BRIEF DESCRIPTION OF THE DRAWINGS

The above and other objects, features and advantages of the present disclosure will be more apparent from the following detailed description taken in conjunction with the accompanying drawings.

FIG. 3 is a view illustrating an example of a routing time table according to an exemplary embodiment of the present disclosure.

FIG. 5 is a view illustrating an example of a routing location pattern table according to an exemplary embodiment of the present disclosure.

FIG. 6 is a view illustrating an example of a routing location table according to an exemplary embodiment of the present disclosure.

DETAILED DESCRIPTION

Figure 1:
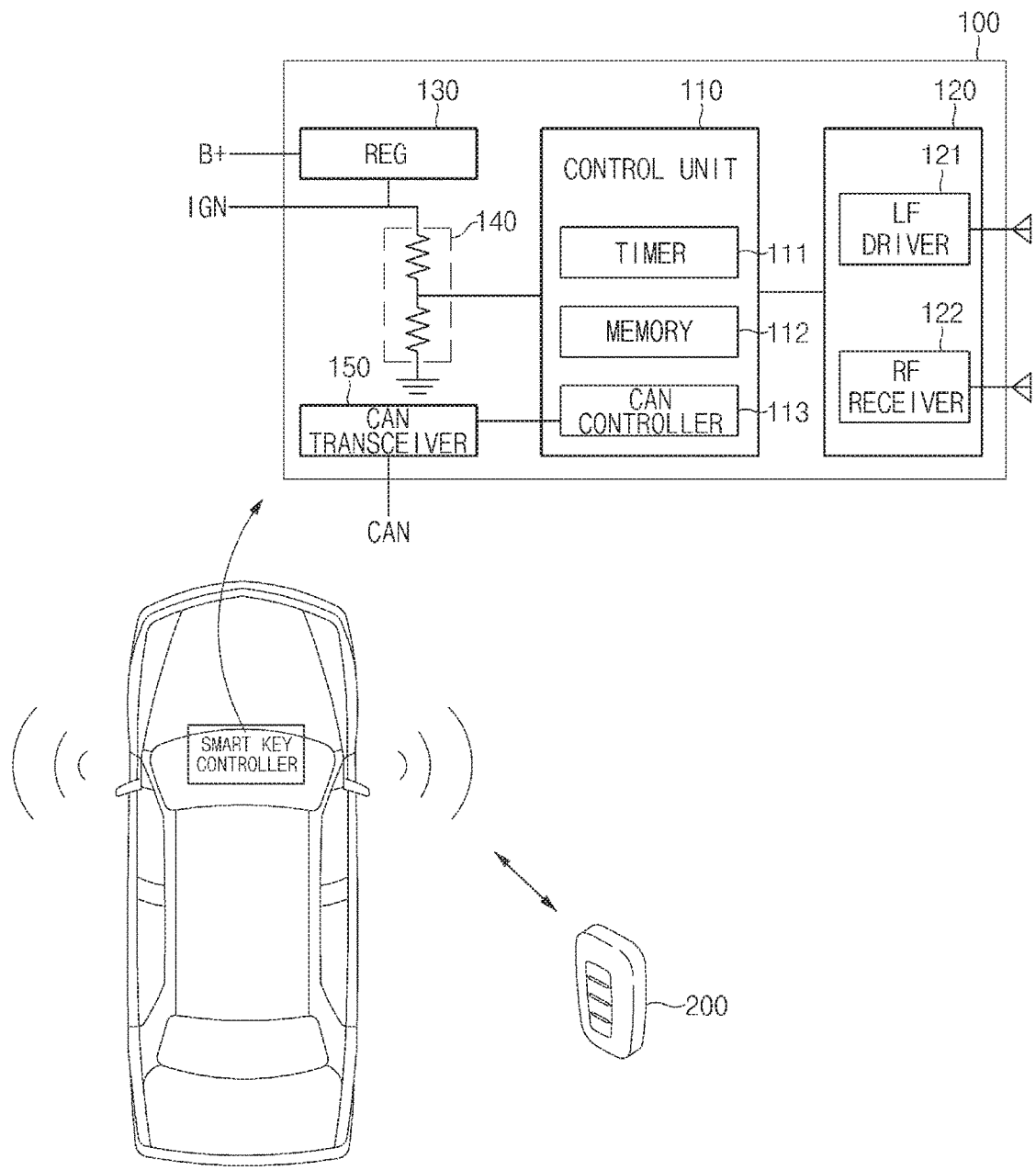
FIG. 1 is a view illustrating a smart key controller according to an exemplary embodiment of the present disclosure.

Hereinafter, exemplary embodiments of the present disclosure will be described in detail with reference to the accompanying drawings. In this case, in each drawing, like reference numerals refer to like elements. Also, the detailed descriptions of the relevant known functions and/or configurations are omitted. In the below-disclosed details, descriptions will focus on elements necessary to understand operations according to various exemplary embodiments, and the detailed descriptions on elements which unnecessarily obscure the important points of the descriptions will be omitted. Also, in the drawings, some elements may be exaggerated, omitted, or schematically illustrated. The size of each element does not entirely reflect an actual size, and thus, details described herein are not limited by the relative sizes or interval of elements illustrated in each drawing.

FIG. 1 is a view illustrating a smart key controller 100 according to an exemplary embodiment of the present disclosure.

Referring to FIG. 1, a smart key controller 100 according to an exemplary embodiment of the present disclosure for controlling a vehicle through wireless communication with a smart key 200 may include a control unit 110 and a communicator 120. The smart key controller 100 further may include a regulator 130, an auxiliary circuit 140, and a controller area network (CAN) transceiver 150 connected to the control unit 110.

The control unit 110 generally may control a plurality of predetermined vehicle operations (hereinafter, referred to as "smart key operations") performed according to user's operation of the smart key 200 such as starting of a vehicle, opening/closing a vehicle door or a trunk, or a welcome function through wireless communication with the smart key 200 such as a FOB type smart key or a card type smart key. The control unit 110 may be implemented as a semiconductor processor such as a microcontroller unit (MCU), or the like, may include a timer 111 and a memory 112, and may include a CAN controller 113 for interfacing with the CAN transceiver 150.

The control unit 110 may receive and collect location information, for example, global positioning system (GPS) information, from the CAN transceiver 150 through the CAN controller 113. The CAN controller 113 may interwork with the CAN transceiver 150 connected to a CAN bus to receive location information from a vehicle GPS module (not shown). In the present disclosure, the CAN transceiver 150 and the CAN controller 113 are not essential and location information may be further used to realize the present disclosure as described hereinafter.

Also, a user may set the timer 111 to indicate a current time (for example, an absolute time such as a world time, or the like). In addition, in a case in which a GPS module (not shown) is provided, the control unit 110 may synchronize a time of the timer 111 according to a GPS time of GPS information after booting. In a case in which the GPS module (not shown) is not provided, the control unit 110 may synchronize a time of the timer 111 upon receiving time information from a digital multimedia broadcasting (DMB) module or a telematics unit of a vehicle interworking with a sever on a network such as the Internet.

The communicator 120 may include a low frequency (LF) driver 121 transmitting a wireless LF (e.g., 125 KHz) signal to request authentication information to the smart key 200 under the control of the control unit 110 for a smart key operation and a radio frequency (RF) receiver 122 receiving a wireless RF (e.g., 2.4 GHz) signal for a smart key operation such as a welcome function operation from the smart key 200. The LF (signal) driver 121 may transmit an LF signal though an antenna installed at an appropriate position within or outside of the vehicle, and the RF (signal) receiver 122 may receive an RF signal through an antenna installed at an appropriate position within or outside of the vehicle.

The regulator 130 may be connected to the auxiliary circuit 140 and generate a predetermined constant voltage using vehicle battery power (B+). As described hereinafter, the regulator 130 and the auxiliary circuit 140 may be used to check a wake-up of an ignition signal IGN of a vehicle engine and collect a start time. For example, when the ignition signal IGN in an OFF state is turned on, the auxiliary circuit 140 may change a deactivation signal into an activation signal and output the activation signal to the control unit 110.

In the present disclosure, in particular, the smart key controller 100 having the aforementioned configuration may analyze a vehicle routing pattern of a user and variably operate according to the analyzed vehicle routing pattern to thereby reduce a dark current for a smart key operation and lengthen a welcome function providing time. The welcome function may be a function enabling a user to approach a vehicle and operate a smart key to control unfolding an outside mirror (an outside mirror in a folded state is automatically spread) or control turning on a puddle lamp provided at a lower end of the outside mirror or a door handle lamp, or turning on a tail light or a room lamp to help secure a visual field.

The welcome function may not always be in an ON state. That is, in order to avoid battery discharge and secure start performance, the control unit 110 may turn off the welcome function when a predetermined period of time has lapsed since an ignition of a vehicle was turned off and the vehicle was parked with doors locked. In the related art, a large amount of dark current is consumed to periodically transmit an LF signal for the welcome function. However, in the present disclosure, a time during which the ignition signal IGN is activated and location information are learned to form a table related to a vehicle routing pattern in the memory 112, and an LF signal is frequently transmitted at a time zone during which a user such as a driver, or the like, uses the welcome function. Additionally, a signal transmission period is lengthened or the LF signal is not transmitted at a time zone during which it is expected that the user such as a driver, or the like, does not use the welcome function, whereby a dark current is reduced and a welcome function providing time is lengthened.

Hereinafter, an operation of the smart key controller 100 according to an exemplary embodiment of the present disclosure will be described with reference to FIG. 2.

Figure 2:
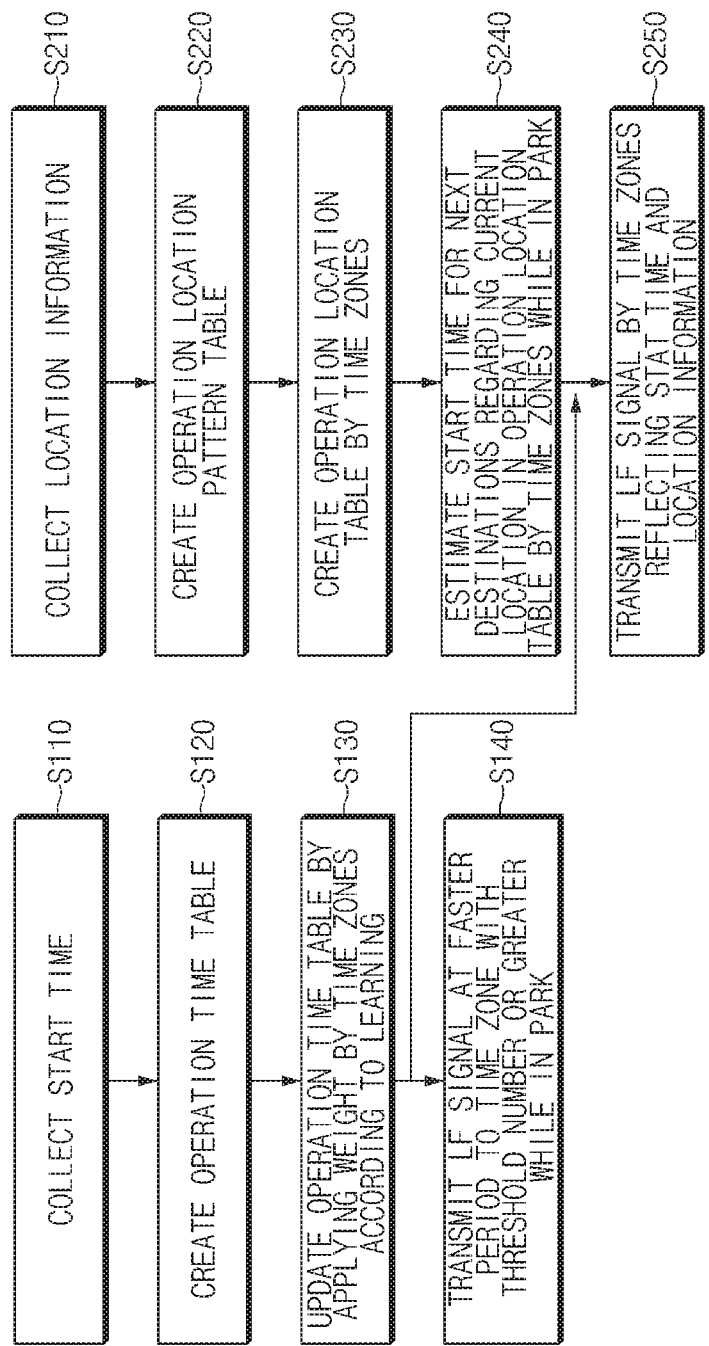
FIG. 2 is a flow chart illustrating an operation of a smart key controller according to an exemplary embodiment of the present disclosure.

Referring to FIG. 2, first, in order to control an operation of the smart key having the welcome function according to an exemplary embodiment of the present disclosure, the control unit 110 may collect a start time of the vehicle by checking an active state of an ignition signal IGN through the auxiliary circuit 140 in operation S110.

The control unit 110 may determine that the vehicle operates according to an active state of the ignition signal IGN, create an operation time table regarding the number of vehicle operations by time zones on the basis of a current time (for example, an absolute time such as a world time) by the timer 111 as illustrated in FIG. 3, and store the created operation time table in the memory 112. For example, the control unit 110 may create an operation time table regarding the number of vehicle operations of each time zone such as 0 o'clock to 1 o'clock, 1 o'clock to 2 o'clock, and the like, by days as illustrated in FIG. 3.

Here, the control unit 110 may update the operation time table (FIG. 3) by applying a weight for each time zone to each day through learning in operation S120. For example, the control unit 110 may update the operation time table (FIG. 3) by applying different weights to each time zone according to a size of a valid operation number of each time zone reflecting results of learning during a predetermined period of time, and use the updated operation time table (FIG. 3) to control the welcome function. Here, at an initial stage in which there is no learning result, a start time is collected for a predetermined period of time (for example, four weeks) and analyzed to update the operation time table (FIG. 3) as described above, and preferably, the vehicle is not actually controlled. An initial learning time may be variably operated according to an amount of collected data.

Figure 4A:
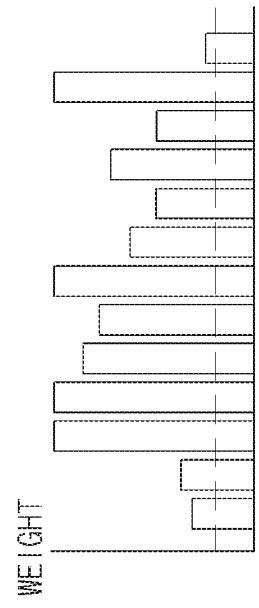
FIG. 4A, FIG. 4B, FIG. 4C and FIG. 4D are views illustrating applications of weight to a routing time table according to an exemplary embodiment of the present disclosure.
Figure 4B:
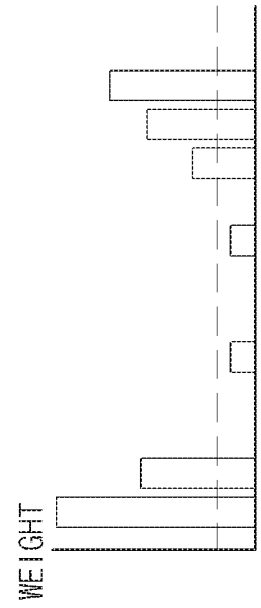
Figure 4C:
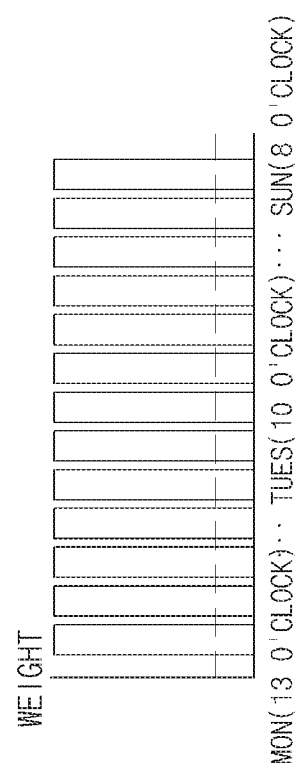
Figure 4D:
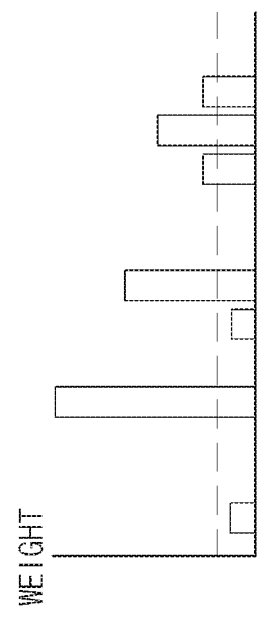

For example, as illustrated in FIG. 4A, FIG. 4B, FIG. 4C, FIG. 4D, the same weight may be applied to each time zone of the operation time table (FIG. 3) at an initial stage of learning (FIG. 4A). Thereafter, as learning is in progress, the operation time table (FIG. 3) regarding the vehicle operation number of each time zone may be updated by days, and the weight may be reduced in a time zone during which the vehicle is not operated according to a predetermined rule (FIG. 4B). Also, while learning is in progress, different weights may be applied to each time zone according to a size of a valid value of a vehicle operation number, that is, a valid operation number, of each time zone in the operation time table (FIG. 3) and (FIG. 4C) to update the operation time table (FIG. 3) to reflect the valid time zone (FIG. 4D). For example, the valid operation number may be an operation number obtained by counting, as a valid vehicle operation, a case in which a driving time from a point in time at which the ignition signal IGN is activated to a point in which the ignition signal IGN is changed to be deactivated is equal to or greater than a threshold time (for example, ten minutes, or the like) or a case in which a driving distance from a point in time at which the ignition signal IGN is activated to a point in which the ignition signal IGN is changed to be deactivated is equal to or greater than a threshold distance (for example, 1 kilometer, or the like) on the basis of GPS information.

The control unit 110 may manage the operation time table (FIG. 3) updated through learning and stored in the memory 112 such that it is backed up and stored in a separate flash memory or a non-volatile memory (not shown) such as an EEPROM, or the like, in unit of a predetermined period of time (e.g., one week). Here, in preparation for a case in which power is interrupted during backup, dual backup may be used by allocating a storage space as much as twice or more, and in order to check an absolute time, time information of the timer 111 may be additionally backed up.

While the vehicle is parked, the control unit 110 may compare the vehicle operation number of each time zone with a threshold operation number (for example, ten times)

by using the operation time table (FIG. 3) updated through learning, generate an active signal for the welcome function at a predetermined period in a time zone in which operation frequency is higher than the threshold operation time (for example, ten times), and accordingly, the LF driver 121 may generate a wireless LF signal for communication with the smart key 200 at the corresponding period in operation S140.

The control unit 110 may perform control to generate an active signal and a corresponding LF signal at a faster period such as a period of 240 ms, or the like, in a time zone in which operation frequency is higher than the threshold operation time (for example, ten times), and may not generate an active signal in a time zone in which operation frequency is less than the threshold operation number (for example, ten times) such that the welcome function may be turned off (such that generation of the LF signal is stopped). However, according to circumstances, the control unit 110 may perform control to generate the LF signal at a slower period such as a period of 720 ms, or the like, in a time zone in which operation frequency is less than the threshold operation number (for example, ten times). Also, in another example, the control unit 110 may perform control to generate an LF signal at a slower period such as a period of 720 ms, or the like, for a predetermined period of time (for example, 30 minutes) before and after the time zone in which operation frequency is higher than the threshold operation number (for example, ten times), and turn off the welcome function at a time thereafter.

Also, the control unit 110 may receive information regarding remaining battery capacity from the CAN transceiver 150 through the CAN controller 113, and when the remaining battery capacity is lower than a predetermined threshold value, the control unit 110 may not generate an active signal such that the welcome function may be turned off (such that generation of an LF signal is stopped). A battery management system (BMS) of the vehicle may provide the information regarding remaining battery capacity.

Meanwhile, in order to control an operation of the smart key having the welcome function according to an exemplary embodiment of the present disclosure, vehicle location information such as GPS information may be further collected from a GPS module (not shown) periodically in operation S210. That is, the control unit 110 may receive and collect location information, for example, GPS information, from the CAN transceiver 150 through the CAN controller 113. The control unit 110 may generate an active signal for the LF driver 121 to transmit an LF signal by further reflecting a location having predetermined operation frequency or greater according to results obtained by analyzing the collected location information through learning during a predetermined period of time.

On the basis of the foregoing vehicle location information, the control unit 110 may analyze an operation location pattern from a point in time at which the ignition signal IGN is activated at a departure location to a point in time at which the ignition signal IGN is deactivated at a destination, create an operation location pattern table in order of priority of high frequency pattern as illustrated in FIG. 5, store the created operation location pattern table in the memory 112, and update the operation location pattern table (FIG. 5) through learning in operation S220. The operation location pattern table (FIG. 5) may include information regarding a departure location and a destination, a driving time from a point in time at which the ignition signal IGN is activated to a point in time at which the ignition signal IGN is deactivated, an operation frequency during a predetermined period, and a final time at which the vehicle arrives at a destination of a corresponding pattern. The control unit 110 may configure and manage a predetermined number (for example, one hundred) of operation location patterns in the operation location pattern table (FIG. 5), and, among the predetermined number of operation location patterns, the control unit 110 may manage information regarding a predetermined higher number (for example, seventy five) of operation location patterns as valid patterns and use them to control the welcome function. Here, the invalid lower operation location patterns may be updated to be higher through learning during a predetermined period of time, and the higher patterns may also be managed as invalid patterns through learning during a predetermined period of time.

The control unit 110 may generate an operation location table regarding operation location patterns of each time zone having predetermined frequency or greater with respect to vehicle operations as illustrated in FIG. 6 according to the operation location pattern table (FIG. 5), store the generated operation location table in the memory 112, and update the operation location table by time zones (FIG. 6) through learning in operation S230. For example, with reference to the operation location pattern table (FIG. 5) regarding each time zone such as 0 o'clock to 1 o'clock, 1 o'clock to 2 o'clock, . . . , by days as illustrated in FIG. 6, the control unit 110 may search for one or a plurality of operation location patterns, and when a corresponding operation location pattern having predetermined frequency or greater appears, the control unit 110 may record the corresponding operation location pattern by time zone in the corresponding operation location table (FIG. 6) and update it accordingly.

Here, for example, the control unit 110 may update the operation location pattern table (FIG. 5) and the operation location table for each time zone (FIG. 6) to reflect results of learning during a predetermined period of time, and use the updated tables (FIGS. 5 and 6) to control the welcome function with respect to a current vehicle state. Here, at an initial stage in which there is no learning result, location information may be collected for a predetermined period of time (for example, four weeks) and analyzed to update the operation location pattern table (FIG. 5) and the operation location table by time zones (FIG. 6) as described above, and preferably, the vehicle is not actually controlled. An initial learning time may be variably operated according to an amount of collected data.

Also, the control unit 110 may manage the operation location pattern table (FIG. 5) and the operation location table by time zones (FIG. 6) updated through learning and stored in the memory 112 such that it is backed up and stored in a separate flash memory or a non-volatile memory (not shown) such as an EEPROM, or the like, in a unit or units of a predetermined period of time (e.g., one week). Here, dual backup may be used, and in order to check an absolute time, time information of the timer 111 may be additionally backed up.

While the vehicle is parked, the control unit 110, on the basis of the operation location table by time zones (FIG. 6) updated through learning, may estimate start time zones for next destinations from the parking location with reference to the operation location patterns on the operation location table by time zones (FIG. 6), and generate an active signal for the welcome function at a predetermined period with respect to the corresponding time zone in operation S240. Here, the control unit 110 may generate the active signal for the welcome function at a time zone with high operation frequency equal to or greater than a threshold operation number (for example, ten times) with reference to the operation time table (FIG. 3) such as in operation S140, and may generate the active signal for the welcome function by further reflecting location information with reference to the operation location patterns on the operation location table by time zones (FIG. 6). According to the active signal, the LF driver 121 may generate a wireless LF signal for communication with the smart key 200 at the corresponding period in operation S250.

Figure 7:
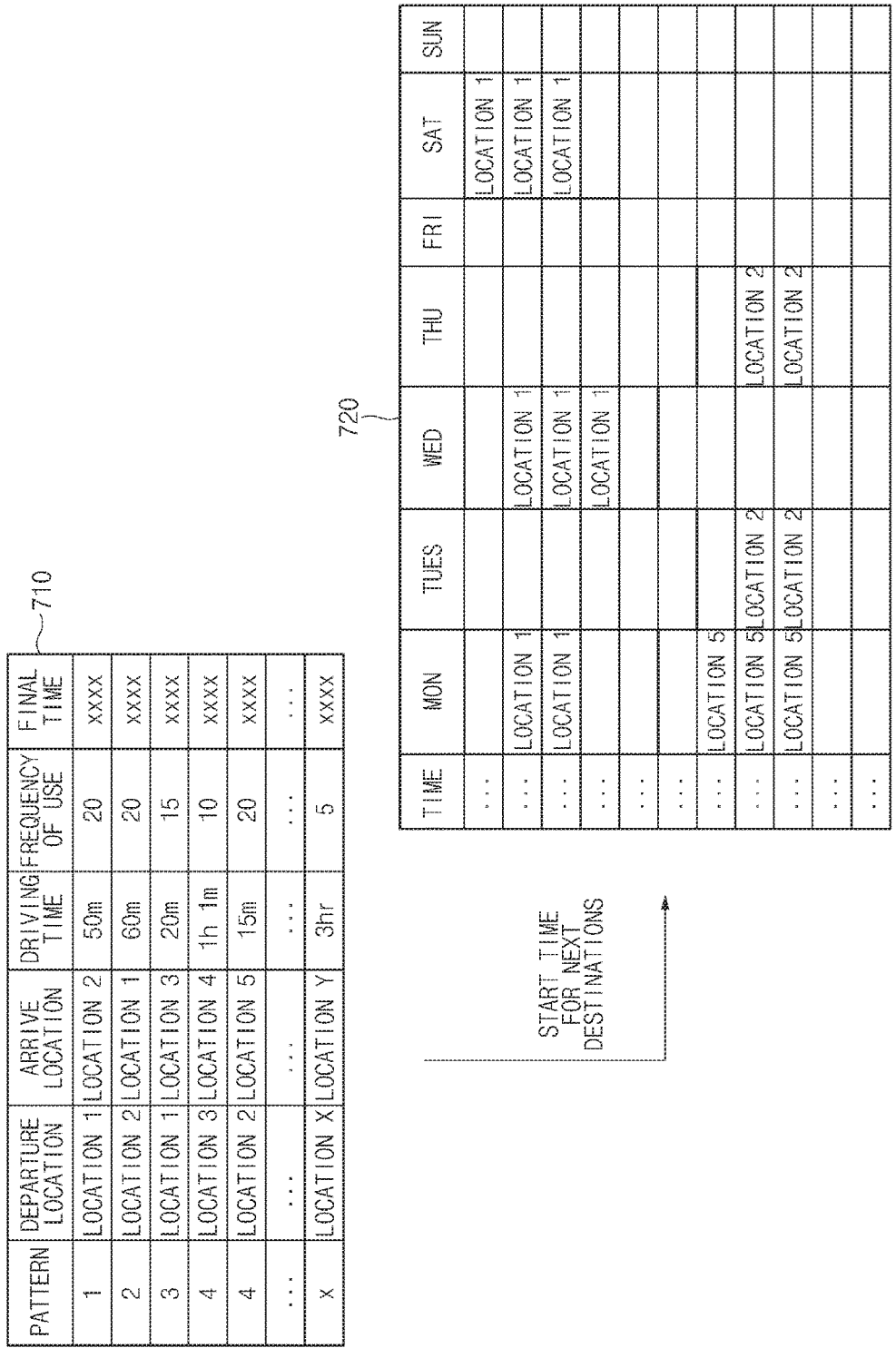
FIG. 7 is a view illustrating an estimation of a start time according to an exemplary embodiment of the present disclosure.

For example, in order to estimate start time zones for next destinations from the parking location of the vehicle, as illustrated in FIG. 7, the operation location patterns on the operation location table by time zones (FIG. 6) may correspond to corresponding patterns on the operation location pattern table (FIG. 5) 710, and thus, the control unit 110 may first determine which of the destinations of 710 the current parking location is. For example, when the parking location is "location 2" of 710, next destinations of the "location 2" as a departure location may be "location 1" and "location 5" in 710. In this manner, the control unit 110 may configure a table 720 regarding start time zones for next destinations from the parking location as illustrated in FIG. 7 and generate an active signal for the welcome function at a predetermined period with respect to the corresponding time zones.

Figure 8:
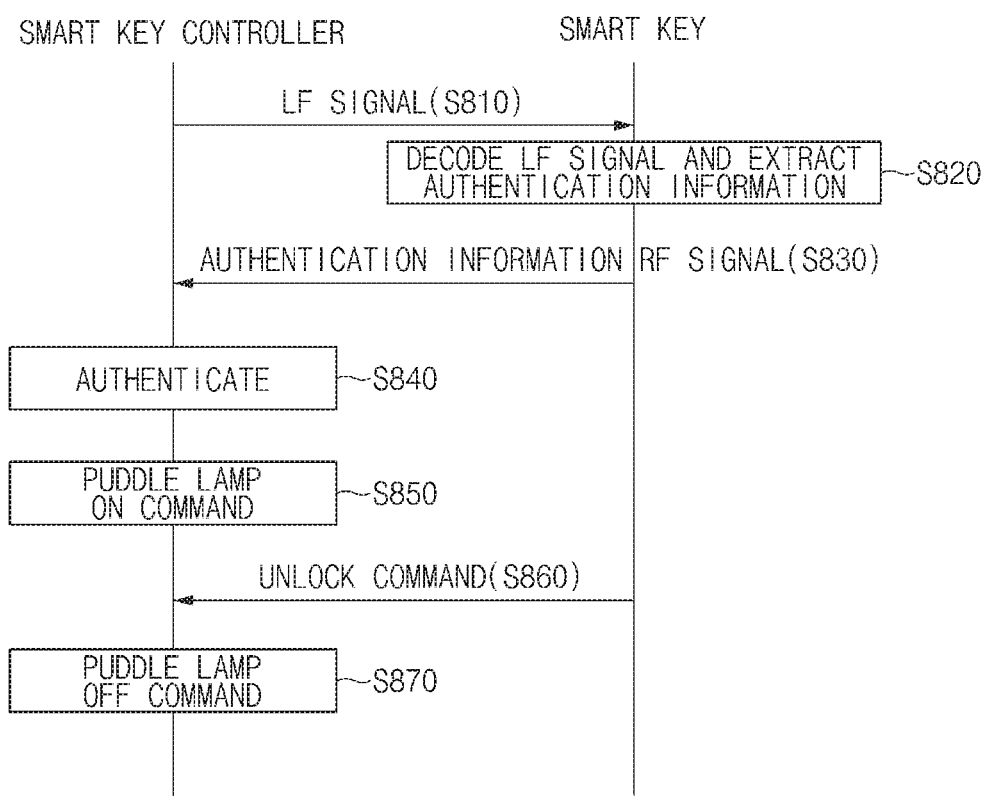
FIG. 8 is a flow chart illustrating a procedure for performing an operation of a welcome function between a smart key controller and a smart key according to an exemplary embodiment of the present disclosure.

FIG. 8 is a flow chart illustrating a procedure for performing an operation of a welcome function between the smart key controller 100 and the smart key 200 according to an exemplary embodiment of the present disclosure.

First, as discussed above, while the vehicle is parked, the control unit 110 may estimate start time zones for next destinations from the parking location with reference to the operation location table (FIG. 6) regarding the operation location patterns by time zones having predetermined operation frequency or greater on the basis of time zones with high operation frequency or on the basis of location information such as GPS information by comparing a vehicle operation number of each time zone with a threshold operation number with reference to the operation time table (FIG. 3) and generate an active signal at a fast period with respect to a time zone with high operation frequency, and, according to the active signal, the LF driver 121 of the smart key controller 100 may generate a wireless LF signal for the welcome function such as unfolding an outside mirror or turning on a puddle lamp provided at the outside mirror, a door handle lamp, a tail light, or a room lamp at a fast period (for example, 240 ms) in operation S810.

Thus, the wireless LF signal may be transmitted through the antenna of the vehicle, and when the user such as a driver, or the like, who carries the smart key 200 approaches the vehicle, the smart key 200 may receive the LF signal, decode the LF signal, extract unique authentication information from an internal storage in operation S820, and transmit a corresponding RF signal (for example, RKE comfort frame) for the welcome function including the unique authentication information in operation S830.

Thereafter, when the RF receiver 122 receives an RF signal for the welcome function including the unique authentication information from the smart key 200, the control unit 110 may perform authentication regarding whether to perform registration in operation S840, and when the authentication is successful, the control unit 110 may transmit a welcome function ON (for example, puddle lamp ON) command to a predetermined control module (for example, driver door module (DDR)) in operation S850.

When the puddle lamp provided at the lower end of the outside mirror is turned on according to the welcome function ON (for example, the puddle lamp ON), the user such as a driver, or the like, approaches the vehicle, while watching out a water hole, or the like, on the ground or floor, and conveniently may open a door of the vehicle through an unlock command by the smart key 200 in operation S860. Accordingly, the control unit 110 may transmit a welcome function OFF (for example, puddle lamp OFF) command to the control module (for example, DDR) to terminate the welcome function.

As described above, in the smart key controller for vehicle routing pattern-based variable control and the method thereof according to exemplary embodiments of the present disclosure, since the smart key controller 100 may variably operate the welcome function at a time and location with high operation frequency according to vehicle operation patterns of users such as drivers, a dark current for operation of the smart key controller 100 may be reduced and a welcome function providing time may be lengthened (for example, 23 days).

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A smart key controller for controlling a vehicle through wireless communication with a smart key, the smart key controller comprising:
   a control unit including a timer and a memory, and creating an operation time table regarding operation numbers by time zones based on the timer by checking an ignition signal, and storing the created operation time table in the memory; and
   a signal driver for generating a wireless signal for communication with the smart key according to an active signal generated by the control unit at a predetermined period in a time zone with high operation frequency by comparing operation numbers of respective time zones and a threshold operation number with reference to the operation time table, while the vehicle is parked,
   wherein the control unit stores an operation location pattern table regarding a departure location and a destination and an operation location table regarding operation location patterns by time zones with a predetermined frequency or greater in the memory, and
   while the vehicle is parked, the control unit estimates start time zones for next destinations from a parked location of the vehicle with reference to the operation location patterns in the operation location table and generates the active signal with respect to a corresponding time zone.

2. The smart key controller according to claim 1, wherein the signal driver generates a wireless signal for a welcome function including at least one of unfolding an outside mirror, turning on a puddle lamp provided in the outside mirror, turning on a door handle lamp, turning on a tail light, or turning on a room lamp.

3. The smart key controller according to claim 1, wherein the control unit generates the operation time table regarding operation numbers of respective time zones by days.

4. The smart key controller according to claim 3, wherein the control unit generates the operation time table by applying different weights to the respective time zones according to sizes of valid operation numbers of the respective time zones through learning during a predetermined period of time.

5. The smart key controller according to claim 1, wherein the control unit further includes a controller area network (CAN) controller for collecting location information received through a CAN transceiver,
wherein the control unit generates the active signal by further reflecting information regarding an operation location with a predetermined operation frequency or greater according to results of analyzing the location information through learning during a predetermined period of time.

6. The smart key controller according to claim 5, wherein the location information is global positioning system (GPS) information.

7. The smart key controller according to claim 1, wherein, regarding a time zone with less than the threshold operation number, the control unit controls the signal driver to stop generation of the wireless signal to turn off a welcome function, controls the signal driver to generate the wireless signal at a period slower than the period, or controls the signal driver to generate the wireless signal at a period slower than the period during a predetermined period of time before and after the time zone with the high operation frequency and subsequently turn off the welcome function.

8. The smart key controller according to claim 1, wherein information regarding remaining battery capacity is received, and when the remaining battery capacity is lower than a predetermined threshold value, the control unit controls the signal driver to stop generation of the wireless signal to turn off the welcome function.

9. A method for operating a smart key controller for controlling a vehicle through wireless communication with a smart key, the method comprising:
creating an operation time table regarding operation numbers by time zones based on a timer by checking an ignition signal;
generating an active signal generated at a predetermined period in a time zone with a high operation frequency by comparing operation numbers of respective time zones and a threshold operation number with reference to the operation time table, while the vehicle is parked;
generating a wireless signal for communication with the smart key according to the active signal; and
generating an operation location pattern table regarding a departure location and a destination and an operation location table regarding operation location patterns by time zones with a predetermined frequency or greater, before the active signal is generated,
wherein, the active signal is generated with respect to a corresponding time zone by estimating, while the vehicle is parked, start time zones for next destinations from a parked location of the vehicle with reference to the operation location patterns in the operation location table.

10. The method according to claim 9, wherein, in the generating of the wireless signal, the wireless signal for a welcome function including at least one of unfolding an outside mirror, turning on a puddle lamp provided in the outside mirror, turning on a door handle lamp, turning on a tail light, or turning on a room lamp is generated.

11. The method according to claim 9, wherein, in the generating of the operation time table, the operation time table regarding operation numbers of respective time zones by days is generated.

12. The method according to claim 11, wherein, in the generating of the operation time table, the operation time table is generated by applying different weights to the respective time zones according to sizes of valid operation numbers of the respective time zones through learning during a predetermined period of time.

13. The method according to claim 9, further comprising:
collecting location information received through a controller area network (CAN) transceiver,
wherein, in the generating of the active signal, the active signal is generated by further reflecting information regarding an operation location with a predetermined operation frequency or greater according to results of analyzing the location information through learning during a predetermined period of time.

14. The method according to claim 13, wherein the location information is global positioning system (GPS) information.

15. The method according to claim 9, wherein, regarding a time zone with less than the threshold operation number, generation of the wireless signal is controlled to be stopped to turn off a welcome function, the wireless signal is controlled to be generated at a period slower than the period, or the wireless signal is controlled to be generated at a period slower than the period during a predetermined period of time before and after the time zone with the high operation frequency and the welcome function is subsequently turned off.

16. The method according to claim 9, wherein information regarding remaining battery capacity is received, and when the remaining battery capacity is lower than a predetermined threshold value, generation of the wireless signal is controlled to be stopped to turn off a welcome function.

* * * * *